Patented June 21, 1932

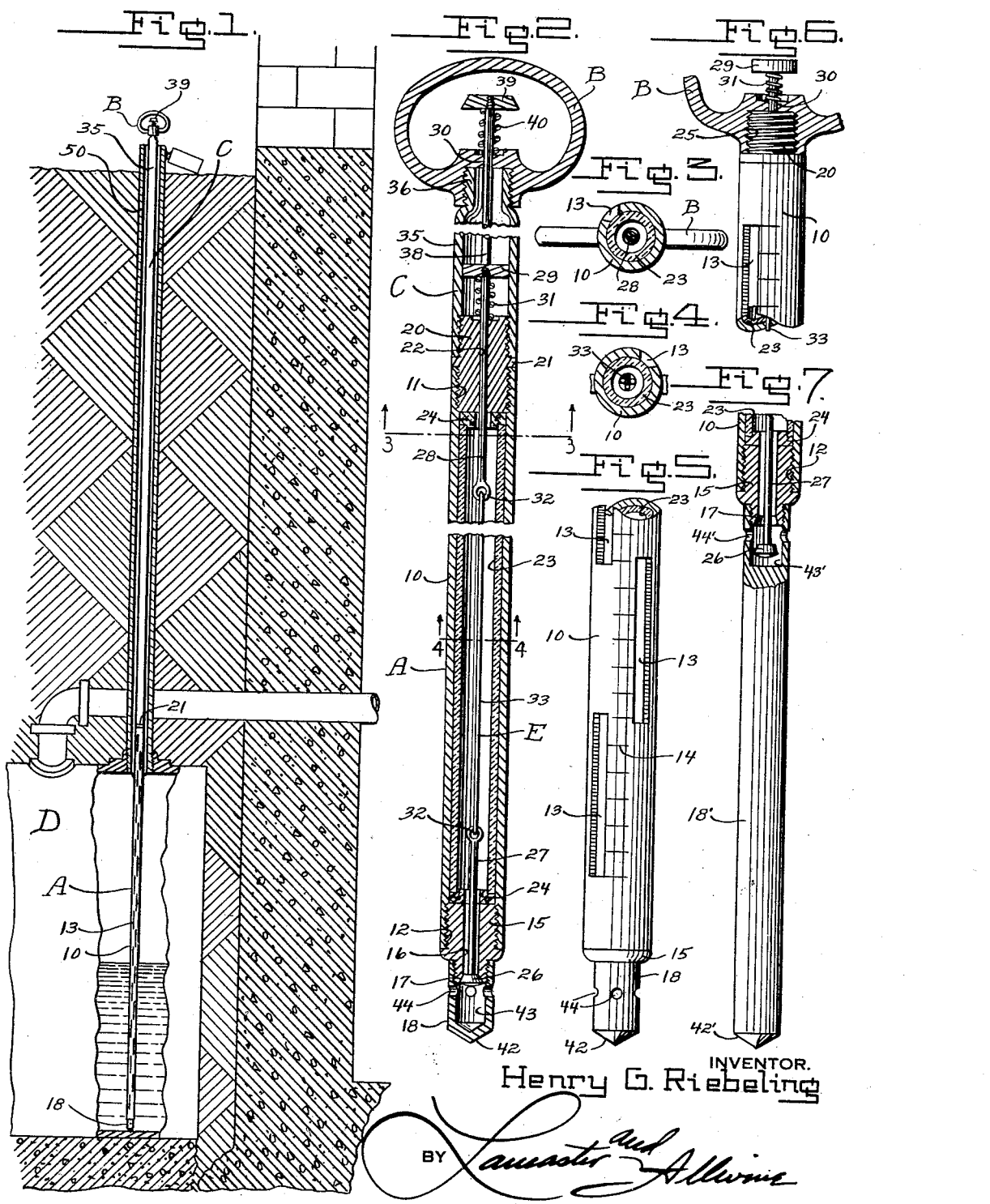
June 21, 1932. H. G. RIEBELING 1,864,472
MEASURING INSTRUMENT OR GAUGE
Filed May 16, 1929
INVENTOR.
Henry G. Riebeling
ATTORNEYS.

1,864,472

UNITED STATES PATENT OFFICE

HENRY G. RIEBELING, OF PENDLETON, INDIANA

MEASURING INSTRUMENT OR GAUGE

Application filed May 16, 1929. Serial No. 363,663.

The present invention relates to measuring instruments or gauges, and the primary object of the invention is to provide a measuring gauge particularly well adapted for use in obtaining accurate readings of the amount of liquid contained in relatively large tanks such as gasoline or fuel oil tanks disposed below the ground level.

A further object of the invention is to provide a measuring gauge which may be used either for gauging the quantity of liquid contained in a tank disposed some distance below the ground level or for use in determining the quantity of liquid in small surface tanks used for various purposes.

A further object of the invention is to provide a measuring instrument which may be used for determining the amount of water in storage tanks filled with gasoline or the like, or obtaining the accurate quantity of different kinds of liquids contained in tanks of various kinds.

A still further object of the invention is to provide a measuring gauge or stick of such construction as to allow for comparatively rough handling of the device without likelihood of destroying the gauge, and one having such construction as to permit accurate reading of the quantity of liquid contained in a protected frangible container without weakening the protecting covering for the frangible container to any material extent.

A still further object of the invention resides in the provision of a measuring gauge adapted to receive and maintain a quantity of the liquid within the gauge at an elevation even with the height of the liquid within the tank or container being measured.

Other objects and advantages of the invention will be apparent during the course of the following detailed description, taken in connection with the accompanying drawing forming a part of this specification and in which drawing:

Figure 1 is a view showing the instrument in use for measuring the quantity of liquid contained in a tank disposed below the ground level.

Figure 2 is an enlarged fragmentary longitudinal section thru the instrument.

Figures 3 and 4 are transverse sections taken on the respective lines in Figure 2.

Figure 5 is a fragmentary side elevation of the lower portion of the gauge.

Figure 6 is a view of the upper end of the gauge showing the hand grip connected directly to the gauge.

Figure 7 is a view in longitudinal section of the lower end of the gauge and showing a longer head applied to the lower end of the gauge.

Referring to the drawing in detail, and wherein similar reference characters designate corresponding parts thruout the several views, the letter A designates the gauge proper provided with the interchangeable hand grip B, and C the handle extension for association with the gauge A when measuring the contents of a storage tank or the like D embedded in the earth at a location beneath the ground surface.

Referring first to the specific construction of the gauge A, the same embodies a metal casing or tube 10 preferably formed from a metal such as brass or the like and of a suitable length in accordance with the relative depth of the tank or container with which the instrument is intended to be used for gauging the liquid contents of the tank. The tubular casing 10 is internally threaded at its upper end as at 11 and internally threaded at its lower end as at 12. Provided in circumferentially offset relation in the tube 10 is a series of elongated slots 13 providing sight openings arranged in stepped relation longitudinally of the tube with the upper end of the slots overlapping on a line circumferentially of the tube with the bottom of the above circumferentially offset slot. These circumferentially offset slots extend thruout substantially the entire length of the tube and are preferably formed in two rows as shown in Figures 1 and 5. Provided exteriorly of the tube 10 on a line between the stepped slots 13 are suitable graduations 14 for either indicating gallons or the depth of the liquid in the tank.

Threaded into the lower end of the tube 10 is a plug 15 provided with an axial way 16 having a flaring lower end providing a tapering valve seat 17. The lower end of the plug 15 is reduced and externally screw threaded for interchangeably receiving the head pieces or members 18 and 18'.

Threaded into the upper end of the tube 10 is a coupling plug or member 20 having externally threaded end portions spaced by an annular flange 21 preferably arranged midway the ends of the coupling plug. The plug 20 is provided with a thru and thru axial opening 22.

Slidably fitting within the metal casing or tube 10 is a transparent tube such as of glass or the like 23 having suitable washers or gaskets 24 provided at its upper and lower ends engageable by the plugs 15 and 20 when threaded into the ends of the metal tube 10. Thus it will be seen that the plugs 15 and 20 serve to retain the glass tube 23 within the casing 10 and form a chamber for receiving and retaining liquid thru manipulation of the valve means generally designated by the letter E.

The hand grip B is preferably in the form of a loop as shown and is provided with a threaded socket 25 for screw threaded reception of the upper threaded end portion of the coupling plug or member 20.

Referring now to the valve means E for opening and closing communication to the lower end of the chamber formed by the cylinder 23, the same embodies a valve 26 for engagement upon the seat 17 and this valve is provided with a stem portion 27 extending upwardly thru the way 16 into the cylinder 23. When the valve 26 is moved upwardly the way 16 is closed for shutting off communication into the cylinder 23. Slidably mounted in the opening 22 provided thru the coupling plug 20 is a push rod 28 having a threaded upper end for threaded reception of a disc-shaped button 29 forming a push button for allowing unseating of the valve 26 when the button is depressed. The hand grip B when threaded upon the coupling plug 20 has the upper end of the rod 28 slidably extended thru a guide opening 30 formed co-axial with the threaded socket 25. Encircling the upper end of the rod 30 between the button 29 and hand grip B is a coiled spring 31 which as will be apparent acts to normally urge the rod upwardly thru the plug 20. The lower end of the rod 20, and the upper end of the valve stem 27 are formed with suitable eyes 32 whereby the rod and valve stem may be connected by a suitable tie member 33 which may be in the form of a wire extended thru the cylinder 23. When the button 29 is pressed and lowers the rod 28 the valve 26 is allowed to lower off the seat 17 for opening the way 16 into the cylinder 23. Upon releasing the button 29 the spring 31 returns the valve 26 to a closing position upon the seat 17.

Referring now to the handle extension C for allowing the gauge to be used for determining the quantity of liquid in an underground tank, the same includes a tubular section 35 preferably of equal diameter as that of the tubular casing 10 and is internally threaded at its lower end for threaded connection with the upper end of the coupling plug or member 20. The tubular extension 35 may be of any desired length in accordance with the depth of the tank below the ground surface. The upper end of the tubular extension is reduced and externally threaded as at 36 to an external diameter equal to the diameter of the coupling plug 20 so that the reduced upper end of the tubular extension may receive the hand grip B by threading the portion 36 into the socket 25.

When the tubular section 35 is threaded upon the coupling plug 20 the valve releasing button 29 extends into the tubular section as shown in Figure 2 with the spring 31 acting between the button 29 and upper end of the coupling member for normally maintaining the valve 26 closed.

The handle extension C is provided with a control means for allowing opening of the valve 26 and this control embodies a control rod 38 adapted to have sliding movement thru the guide way 30 with its lower end normally resting upon the button 29. The upper end of the rod 38 is preferably threaded for threaded reception of an auxiliary operating button 39 which when depressed exerts a downward pressure on the button 29 for unseating the valve 26. A suitable coil spring 40 encircles the rod 38 between the button 39 and hand grip for normally raising the control rod and relieving pressure upon the button 29. This relieving of pressure upon the button 29 prevents likelihood of unseating of the valve 26 thru the weight of the control rod resting upon the button 29.

Referring now to the head pieces 18 and 18' and more specifically to the head piece 18, the same is preferably of hollow cylindrical formation having a closed and preferably pointed lower end 42 and being internally threaded at its upper end for threaded connection with the reduced extension of the plug 15. The head 18 forms a protector for the valve 26 and provides a chamber 43 in which the valve head 26 is operable and may be lowered off the seat 17. Opening into the chamber 43 thru the sides of the head are suitable ports 44 for allowing the liquid to freely pass into the chamber 43, and when the valve 26 is open, pass upwardly thru the way 16 into the chamber formed by the cylinder 23.

The head piece 18' is of like construction as that of the head piece 18 except that the head 18' is of considerably greater length than that of the head 18. The head 18' is of cylindrical formation and has a pointed lower end 42'. The upper end of the head 18' is chambered as at 43' and internally threaded for threaded connection with the lower end of the plug 15. The chamber 43' forms a suitable space for movement of the valve 26, and is provided with ports 44'. The pointed lower ends of the head pieces 18 and 18' aside from serving to readily guide the measuring instrument or stick thru a tube or the like into the tank, also allows the head pieces to readily pass thru any sediment on the bottom of the tank into positive contact with the tank.

The heads 18 and 18' may be interchangeably coupled to the plug 15 for using the measuring instrument for different purposes. The longer head 18' is preferably used for gauging the liquid contents of the tank and when used will dispose the ports 44' a sufficient distance above the bottom of the tank as to prevent any dirt or sediment in the tank from entering the chamber 43' and preventing proper seating of the valve 26. The shorter head 18 will be found especially well adapted for use when testing the tank to determine the amount of water beneath the gasoline or other fluid in the tank and will dispose the ports 44 relatively close to the bottom of the tank. The graduations 14 may be so marked upon the casing 10 as to allow use of either of the heads 18 or 18' for accurately determining the depth of the liquid in the tank.

The object in so arranging the slots 13 in stepped relation longitudinally of the tube 10 with the ends of the slots slightly overlapping, is to permit accurate reading of the graduations thru comparison with the height of the liquid in the cylinder 23, and yet not weaken the metallic casing to any material extent. These narrow slots 13 will also prevent likelihood of the cylinder 23 becoming broken thru rough handling of the instrument.

In use of the measuring instrument for determining the quantity of liquid in a relatively small tank, the hand grip B is coupled directly to the gauge and the gauge lowered into the tank or receptacle until the head engages the bottom of the tank. The button 29 is then depressed allowing the valve 26 to unseat so that the liquid will enter the ports in the head and pass upwardly thru the way 15 until the liquid in the tube is at an even level with that in the tank exteriorly of the gauge. Pressure is then released from the button 29 and the spring 31 allowed to close the valve 26 for retaining the entrapped liquid within the gauge. The gauge may then be withdrawn from the tank and by observing the graduations 14 and the height of the liquid in the cylinder 23, the liquid level in the tank may be readily determined. It will here be noted that opening of the valve 26 is caused by a downward pressure on the gauge and thus the lower end of the gauge is held in contact with the bottom of the tank and insures proper filling of the gauge to the exact height of the liquid in the tank.

When using the measuring instrument for determining the quantity of liquid in an underground tank disposed a substantial distance below the ground surface, the hand grip B is first unthreaded from the coupling member 20 after removal of the button 29 in a manner as will readily be apparent, and after replacement of the button 29 and spring 31 the tubular extension 35 is threaded upon the coupling plug as in Figures 1 and 2. The hand grip is then attached to the reduced upper end of the tubular extension with the rod 38 extending thru the guide way 30 and having its lower end resting upon the button 29. The instrument may then be inserted thru a filler opening or the like as at 50 in Figure 1 so that the gauge A extends into and rests upon the bottom of the tank D. Depressing the button 39 will transmit a like movement to the button 29 and allow the valve 26 to unseat so that the liquid may readily flow into the gauge to the depth of the liquid in the tank. After suitable time has elapsed for the liquid to flow into the gauge, the button 39 may be released and allow the spring 31 to seat the valve 26 and entrap the liquid in the gauge. It may here be well to state that the push rod 28 and the control rod 38 have a sufficiently loose fit in the respective openings 22 and 30 to allow escape of air from the cylinder 23, and that the button 29, when the handle extension C is in use, has a sufficiently loose fit in the tubular extension 35 as to permit ready escape of air past the button. The loop handle or hand grip aside from allowing ready and easy handling of the device also provides means for hanging the device upon a suitable support when not in use.

From the foregoing it will be apparent that a novel and improved measuring instrument or gauge has been provided which will be particularly well adapted for use in determining the quantity of liquid in relatively large tanks, tanks disposed beneath the ground surface, and also in smaller tanks of practically any description. It will further be apparent that an improved measuring gauge or stick has been disclosed embodying a gauge proper of novel construction for entrapping a quantity of the liquid so that an accurate reading of the depth of the liquid in the tank or receptacle may be determined. It will further be apparent that a novel construction for the gauge has been disclosed wherein the particular arrangement of the slots or sight openings do not materially weaken the metallic casing serving to effectively protect the glass cylinder contained therein.

Changes in detail may be made to the form of invention herein shown and described, without departing from the spirit of the invention or the scope of the following claims.

I claim:

1. A liquid measuring gauge comprising an elongated tubular casing provided with sight openings, a transparent cylinder arranged in the casing, a closure plug arranged in the lower end of the casing and having an opening therethru, a hollow ported head carried by the plug, a valve closing the lower end of said plug opening, a coupling plug carried by the upper end of the casing and having a guide way therethru, a handle connected to the coupling plug and having a guide way aligning with the guide way in the coupling plug, a push rod slidable thru said aligning guide ways, tie means between the push rod and said valve, a button carried by the upper end of the push rod, and a coil spring encircling the push rod and acting between the handle and said button for normally retaining the valve seated.

2. A liquid measuring gauge comprising a tubular casing having internally threaded ends and provided with sight openings, a transparent cylinder in the casing, a washer arranged at each end of the cylinder, a closure plug threaded into the lower end of the cylinder into engagement with the washer at the lower end of the cylinder and having an opening therethru, a coupling member threaded into the upper end of the casing into engagement with the washer at the upper end of the cylinder having an elongated guide way therethru and a threaded upper end, a hollow ported cap carried by the closure plug and arranged over the lower end of the opening therethru, a valve closing the lower end of said opening, a handle having a threaded socket for connection with the threaded upper end of the coupling member, and release means for said valve including a push rod removable thru said guide way and spring means acting upon the push rod to normally retain the valve seated.

3. A liquid measuring gauge comprising a tubular casing provided with elongated slots arranged in stepped relation longitudinally of the casing with their ends in overlapping relation on a line circumferentially of the casing, a transparent cylinder in the casing, and valve means arranged in the lower end of the casing for retaining a quantity of liquid entrapped in the cylinder.

4. A liquid measuring stick comprising a gauge including a tubular body having a port in its lower end, a valve for closing said port, a coupling member carried by the upper end of the tubular body and having a threaded upper end, control means for said valve including a push rod longitudinally movable thru the coupling member, a button carried by the upper end of the push rod and spring means normally urging the push rod upwardly, a tubular extension threaded upon the upper threaded end of the coupling member, a handle detachably coupled with the upper end of the tubular extension, a control rod extending thru the tubular extension with its lower end bearing upon said button, and a head provided at the upper end of the control rod for pressing the rod downwardly whereby said push rod will be moved for unseating said valve.

5. A liquid measuring stick comprising a gauge embodying a tubular body having a port in its lower end, a valve for closing the lower end of the port, a coupling plug provided in the upper end of the tubular body and having a threaded extension, control means for said valve embodying a push rod longitudinally movable thru the coupling plug and a button detachably carried by the upper end of the rod, spring means normally urging the rod upwardly and the valve to a closed position, an elongated tubular extension for threaded connection at its lower end with the threaded extension of the coupling plug and having a reduced externally threaded upper end portion of equal diameter as that of the coupling plug extension, a handle having a threaded socket for interchangeable coupling with the plug extension and the reduced upper end of the tubular extension, a control rod longitudinally movable thru the tubular extension and having its lower end resting upon said button, a head piece detachably coupled to the upper end of the control rod, and spring means normally urging the control rod upwardly.

HENRY G. RIEBELING.